(12) United States Patent
Platel et al.

(10) Patent No.: US 11,300,472 B2
(45) Date of Patent: Apr. 12, 2022

(54) INSTALLATION AND METHOD FOR DETECTING AND LOCATING A LEAK IN A FLUID TRANSPORT CIRCUIT, NOTABLY OF AN AIRCRAFT

(71) Applicant: ATEQ, Les Clayes sous Bois (FR)

(72) Inventors: Frederic Platel, Maurepas (FR);
Gabriel Nativel, Les Clayes sous Bois (FR)

(73) Assignee: ATEQ, Les Clayes sous Bois (FR)

( * ) Notice: Subject to any disclaimer, the term of this patent is extended or adjusted under 35 U.S.C. 154(b) by 78 days.

(21) Appl. No.: 16/763,427

(22) PCT Filed: Nov. 13, 2018

(86) PCT No.: PCT/EP2018/081009
§ 371 (c)(1),
(2) Date: May 12, 2020

(87) PCT Pub. No.: WO2019/096759
PCT Pub. Date: May 23, 2019

(65) Prior Publication Data
US 2021/0072110 A1      Mar. 11, 2021

(30) Foreign Application Priority Data

Nov. 16, 2017 (FR) ...................... 1760824

(51) Int. Cl.
*G01M 3/20* (2006.01)
*B64D 45/00* (2006.01)
(Continued)

(52) U.S. Cl.
CPC .............. *G01M 3/20* (2013.01); *B64D 45/00* (2013.01); *G01M 3/26* (2013.01); *G01P 5/02* (2013.01);
(Continued)

(58) Field of Classification Search
CPC ........ B64D 45/00; G01M 3/20; G01M 3/202; G01M 3/222; G01M 3/26; G01M 3/2846;
(Continued)

(56) References Cited

U.S. PATENT DOCUMENTS 3,355,932 A    12/1967   Mulligan
4,494,402 A *   1/1985   Carney .................... G01M 3/26
                                                    73/40
(Continued)

FOREIGN PATENT DOCUMENTS

DE    43 35 894 A1    4/1995
DE    69623171 T2     4/2003
(Continued)

OTHER PUBLICATIONS

Intitut national de recherche et de securite, Edition NRS ED 6088, Detecteurs portables de gaz et de vapeurs; ED6088 Aide-Memoire Technique, pp. 1-15.

*Primary Examiner* — John Fitzgerald
*Assistant Examiner* — Truong D Phan
(74) *Attorney, Agent, or Firm* — Young Basile Hanlon & MacFarlane, P.C.

(57) ABSTRACT

The invention relates to an installation (1) for detecting and locating a leak in at least one fluid transport circuit (Ps, Pt), notably an anemometer circuit of an aircraft, having a leak test apparatus (10) including means (12) for detecting a leak in the said at least one fluid transport circuit (Ps, Pt). In one example, the means for locating a leak includes injecting means (Pp, 14, Ev2) of a trace gas under pressure into the said at least one fluid transport circuit (Ps, Pt), which means are situated in the said leak test apparatus (10), and a trace-gas detection probe (30) intended to be moved along the said at least one fluid transport circuit (Ps, Pt) on the outside thereof, in order to locate the leak.

20 Claims, 3 Drawing Sheets

(51) Int. Cl.
*G01M 3/26* (2006.01)
*G01P 5/02* (2006.01)
*G06F 11/14* (2006.01)
*H04L 29/08* (2006.01)
*H04L 67/12* (2022.01)

(52) U.S. Cl.
CPC .... *G06F 11/1464* (2013.01); *G06F 2201/805* (2013.01); *H04L 67/12* (2013.01)

(58) Field of Classification Search
CPC ........ G01M 3/04; G01M 3/00; G01M 13/003; G01M 13/00; G01P 5/02; G06F 11/1464; G06F 2201/805; H04L 67/12
See application file for complete search history.

(56) References Cited

U.S. PATENT DOCUMENTS

| | | | |
|---|---|---|---|
| 4,686,851 A | 8/1987 | Holm et al. | |
| 4,852,392 A * | 8/1989 | Evans | G01M 3/04 73/41.2 |
| 4,954,087 A | 9/1990 | Lauks et al. | |
| 5,111,137 A | 5/1992 | Heumann et al. | |
| 5,206,097 A | 4/1993 | Burns et al. | |
| 5,546,789 A | 8/1996 | Balke et al. | |
| 5,661,229 A | 8/1997 | Bohm et al. | |
| 5,795,995 A | 8/1998 | Shimaoka et al. | |
| 6,033,233 A | 3/2000 | Haseyama et al. | |
| 6,082,184 A | 7/2000 | Lehmann | |
| 6,272,902 B1 | 8/2001 | Chen et al. | |
| 6,332,350 B1 * | 12/2001 | Inoue | G01M 3/20 73/40 |
| 7,131,316 B2 | 11/2006 | Doehla et al. | |
| 7,779,675 B2 | 8/2010 | Wetzig et al. | |
| 7,905,132 B1 | 3/2011 | Chamberlain | |
| 2002/0008534 A1 | 1/2002 | Yamazaki | |
| 2005/0151456 A1 | 7/2005 | Yoon et al. | |
| 2008/0018355 A1 | 1/2008 | Takekoshi et al. | |
| 2008/0202212 A1 | 8/2008 | Liepert | |
| 2009/0095095 A1 | 4/2009 | Hayashi et al. | |
| 2009/0164148 A1 | 6/2009 | Shinoda | |
| 2011/0163740 A1 * | 7/2011 | Russell | G01N 27/72 324/220 |
| 2014/0239962 A1 | 8/2014 | Oda et al. | |
| 2015/0114092 A1 * | 4/2015 | Paidosh | G01M 3/2869 73/40.7 |
| 2016/0150690 P1 | 5/2016 | Bedard | |
| 2018/0026313 A1 | 1/2018 | Fukuoka et al. | |
| 2018/0328808 A1 * | 11/2018 | Jourdan | G06F 3/014 |
| 2018/0328810 A1 | 11/2018 | Wetzig | |
| 2020/0182733 A1 * | 6/2020 | Yao | G01M 3/229 |

FOREIGN PATENT DOCUMENTS

| | | | | |
|---|---|---|---|---|
| DE | 10 2012 214738 A1 | | 2/2014 | |
| DE | 10 2014 205918 A1 | | 10/2015 | |
| EP | 0 826 954 A2 | | 3/1998 | |
| EP | 1214635 A1 | | 6/2002 | |
| EP | 1467200 A1 | | 10/2004 | |
| EP | 2270458 A1 | | 1/2011 | |
| EP | 2672246 A1 | | 12/2013 | |
| FR | 2283431 A1 | | 3/1976 | |
| FR | 2558592 A1 | | 7/1985 | |
| FR | 2 734053 A1 | | 11/1996 | |
| FR | 2 971 501 A1 | | 8/2012 | |
| GB | 2049954 A | | 12/1980 | |
| GB | 2049954 A | * | 12/1980 | ............. G01M 3/26 |
| WO | 0104716 A1 | | 1/2001 | |
| WO | 2011132391 A1 | | 10/2011 | |
| WO | 2016/150690 A1 | | 9/2016 | |
| WO | 2017012904 A1 | | 1/2017 | |
| WO | 2019/053121 A1 | | 3/2019 | |

* cited by examiner

INSTALLATION AND METHOD FOR DETECTING AND LOCATING A LEAK IN A FLUID TRANSPORT CIRCUIT, NOTABLY OF AN AIRCRAFT

CROSS-REFERENCE TO RELATED APPLICATIONS

This application is filed pursuant to 35 USC 371 and claims priority benefit to PCT application no. PCT/EP2018/081009 filed Nov. 13, 2018 which claims priority benefit to French patent application no. 1760824 filed Nov. 16, 2017, both applications are incorporated herein by reference in their entirety.

TECHNICAL FIELD

The present invention relates to the detection and location of leaks in liquid or gaseous fluid transport circuits, the leak-tightness whereof must be monitored.

More specifically, the invention relates to the detection and location of such leaks using a trace gas.

The invention finds a particular application in the field of aeronautics, particularly in static and total pressure measurement circuits, the operation whereof requires perfect leak-tightness.

BACKGROUND

Aircraft anemometer circuits are used to supply static and total pressure measurements to the aircraft air data computer for determining values of parameters, particularly the flight speed and altitude of the aircraft, which are used for piloting the latter.

Each of these two circuits consists of tubes of small internal diameter.

These separate circuits are connected respectively to at least one static pressure tap and to a so-called pitot tube placed on the aircraft fuselage.

For obvious safety reasons, it must be possible to detect any failure in these circuits reliably and quickly, as otherwise the measurements made provide incorrect values for the above-mentioned parameters (used for piloting), which may have very harmful consequences for the safety of the aircraft during the flight.

During aircraft operation, it is necessary in particular to monitor the leak-tightness of these anemometer circuits.

At the present time, this operation is carried out by means of test apparatuses designed solely for detecting any leaks.

In a known manner, this type of apparatus generates pressures corresponding to different speeds and altitudes, the user having to corroborate the indication of the on-board instruments with the indication of the test apparatus.

None of the existing apparatuses is designed to enable the location of a potential leak in the anemometer circuits of an aircraft.

Thus, when a leak is detected on these circuits, one technique consists of using a soapy solution which is applied on the outer surface of the circuits.

A pressurised gas is blown into the circuit under test and the presence of bubbles on the outer surface of the circuits makes it possible to locate the location of the leak(s).

However, such a technique has several drawbacks.

Besides the fact that it is time-consuming for an operator or technician, it cannot be carried out on the entire circuit under test as certain constituent elements thereof may be damaged by the soapy solution, due to corrosion in particular.

Moreover, this leak location technique essentially relies on the human factor.

Thus, a leak may inadvertently not be detected by the operators, particularly in the case of a very small leak.

Moreover, in sectors such as aeronautics where safety plays a major role, traceability must be optimal. However, this type of apparatus does not allow traceability of tests on anemometer circuits.

Therefore, there is an alternative need to the solutions for locating leaks according to the prior art to minimize the complexity of use thereof while reducing the detection time and allowing the detection of very small leaks.

SUMMARY

The aim of the invention is that of providing a technique for detecting and locating a leak remedying at least some of the drawbacks of the prior art cited above.

Notably, one aim of the present invention is that of providing a solution for detecting and locating leaks in a fluid transport circuit quickly, reliably and at a reduced cost.

These aims, along with others which will emerge hereinafter, are achieved thanks to the invention which relates to an installation for detecting and locating a leak in at least one fluid transport circuit, notably an anemometer circuit of an aircraft, comprising a leak test apparatus comprising means for detecting a leak in said at least one fluid transport circuit.

According to the invention, said installation further comprises means for locating a leak comprising:
  means for injecting a trace gas under pressure into said at least one fluid transport circuit, situated in said leak test apparatus, and
  a trace gas detection probe intended to be moved along said at least one fluid transport circuit on the outside thereof, in order to locate the leak.

Such an installation makes it possible to carry out leak detection and location tests on one or more anemometer circuits of an aircraft with a single test apparatus.

Thus, when a leak is detected by the test apparatus, it is not necessary to disconnect same in order to connect leak location means in the place thereof.

On the contrary, the test apparatus is used to pressurise the anemometer circuit with trace gas and the leak is sought using a sniffer type detect sensitive to this gas.

Thus, the user's task is simplified, only the connection to a trace gas source being required between the leak detection phase and the leak location phase.

The invention further makes it possible to reduce the costs relating to the implementation of such tests.

Advantageously, the probe for detecting said trace gas is connected to said test apparatus by a wired or wireless link.

Such a link enables the communication of data from the probe to the test apparatus. A wireless link optimizes the workability of the probe and simplifies the operator's task.

Advantageously, said installation comprises at least one indicator of the presence of a leak, situated on the apparatus or the detection probe.

An audio and/or visual indicator disposed on the console of the test apparatus or on the sniffer detector enables the operator to locate a leak accurately and quickly.

Preferentially, said test apparatus comprises means for draining said trace gas situated inside said at least one fluid transport circuit.

Once the leak has been located and repaired, it is necessary to drain the circuit of the trace gas for proper operation of the circuit.

According to a particular use of the invention, said trace gas is helium.

It may however consist of a gas other than helium.

According to a particular aspect of the invention, the installation comprises a control interface comprising input means and display means of data relating to the leak detection or leak test.

Thus, the user can input and display the parameters of the leak test and leak location phases, such as the pressure values in the circuit(s), the pressure values measured in the circuits, the test duration, the value of the leaks.

Moreover, such an interface enables the user to monitor the progress of the test step by step.

Said interface may be portable so as to be suitable for being moved by a user and connected by a wired or wireless link, of the WI-FI (registered trademark) type, to the test apparatus.

In a particular embodiment of the invention, said test apparatus comprises communication means configured to exchange data with a remote data backup unit.

The use of a connection between the test apparatus and a remote storage or data backup unit ensures the traceability of the leaks located on an aircraft in particular.

This further makes it possible to enhance the design of the circuits or to ascertain which zones require particular attention from the operator during future leak location tests.

Moreover, this configuration may make it possible to minimize the time allocated to circuit diagnostics by automatically associating the parameters of the method, such as the set-point values, the time intervals, etc. according to the circuit and the type of aircraft to be tested.

Advantageously, said test apparatus comprises connection means to a trace gas source.

Thus, when a leak is detected, it is not necessary to disconnect the leak test apparatus to connect, in the place thereof, means for locating the leak detected. The operator's task is thus simplified.

The invention also relates to a method for detecting and locating a leak in at least one fluid transport circuit, notably an anemometer circuit of an aircraft, used in an installation as described above, comprising the steps of:
  pressurising inside said at least one fluid transport circuit,
  first pressure measurement inside said at least one fluid transport circuit and second pressure measurement after a predetermined time interval,
  comparing the first and second pressure measurements,
  and in the case where a pressure drop corresponding to the presence of at least one leak is detected:
    injecting a trace gas into said at least one fluid transport circuit, and
    locating said leak using the trace gas detection probe intended to be moved along said at least one fluid transport circuit on the outside thereof.

According to a particular aspect of the invention, prior to said step of injecting a trace gas, the method comprises a step of evacuating said at least one fluid transport circuit.

According to a particular aspect of the invention, once the leak has been located, the method comprises a step of extracting said trace gas from said at least one fluid transport circuit.

BRIEF DESCRIPTION OF THE DRAWINGS

The invention, as well as the various advantages thereof, will be understood more readily on reading the following description of an embodiment thereof, given merely by way of illustrative and non-limiting example, and the appended drawings, wherein.

DETAILED DESCRIPTION

Figure 1:
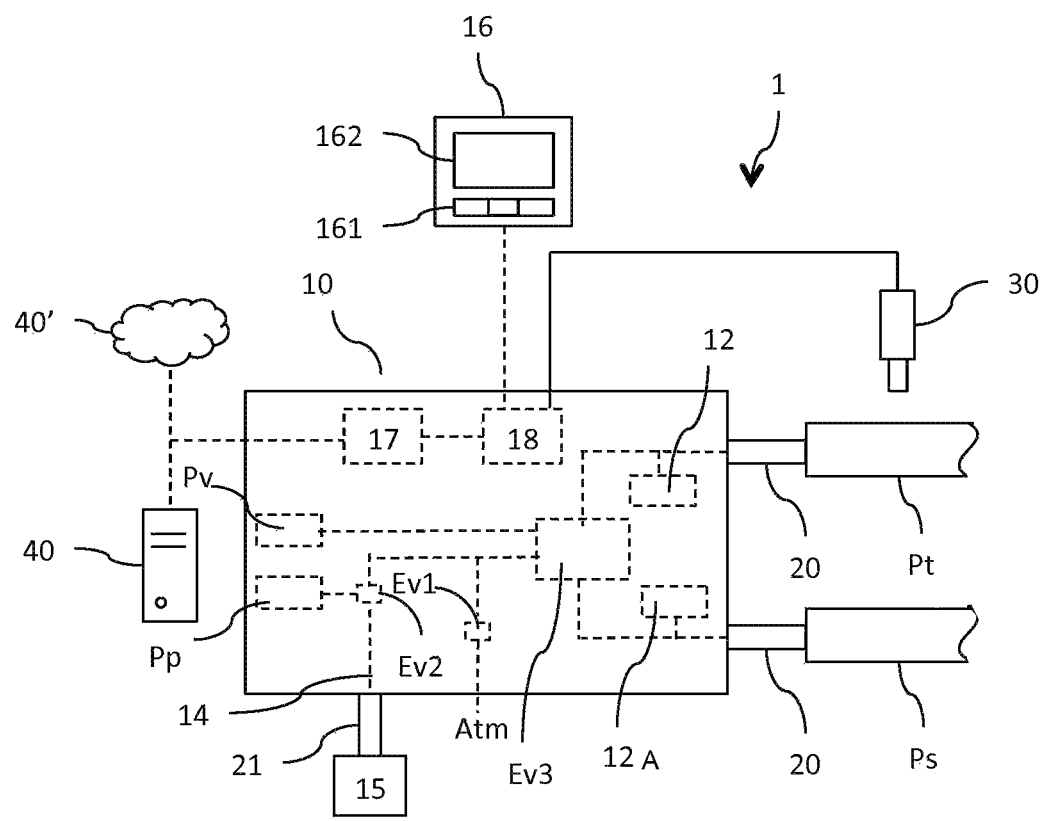
FIG. 1 represents the schematic diagram of an installation according to the invention when it is used for detecting and locating a leak in the anemometer circuits of an aircraft.

Leak testing of the anemometer circuits of an aircraft is performed, according to the invention, by means of an installation 1 for detecting and locating leaks represented schematically in FIG. 1, when the aircraft is on the ground.

The anemometer circuits are the pitot circuit Pt and static circuit Ps of the aircraft.

The installation 1 for detecting and locating leaks comprises a portable leak test apparatus 10 connected to the pitot circuit Pt and static circuit Ps via flexible tubes 20.

In a known manner, the test apparatus 10 generates pressures corresponding to different speeds and altitudes.

To do this, the test apparatus 10 comprises a pressure pump Pp configured to inject pressurised air into the pitot circuit Pt and/or static circuit Ps, and selection means, in this instance electrovalves Ev3, configured to select the pitot circuit Pt and/or static circuit Ps wherein the pressurised air is injected.

These electrovalves are controlled electrically.

Conventionally, the test apparatus 10 has an outer surface whereon the operator control knobs, indicators, connection sockets, etc., are disposed.

The pressure pump Pp directs pressurised atmospheric air in internal conduits towards the pitot circuit Pt and/or static circuit Ps of the aircraft via connection tubes 20.

The test apparatus 10 further comprises a vacuum pump Pv configured to extract the gas contained in the pitot circuit Pt and static circuit Ps.

Moreover, the test apparatus 10 comprises a first pressure sensor 12, configured to measure the pressure inside the pitot circuit Pt and a second pressure sensor 12A configured to measure the pressure inside the static circuit Ps.

In order to detect a leak, the test apparatus 10 makes a first pressure measurement in the circuits originating from the pressure sensors, then a second pressure measurement after a predetermined time interval.

It compares these spaced-apart measurements and determines the presence or not of leaks in the circuits according to whether these measurements are different or not.

According to the invention, the installation 1 further comprises means for locating leaks in the pitot circuit Pt and static circuit Ps.

Such means for locating a leak comprise means for injecting a pressurised trace gas into the pitot circuit Pt and/or static circuit Ps, and a trace gas detection probe 30.

The means for injecting a trace gas comprise:
  the pressure pump Pp,
  an internal trace gas feed duct 14 suitable for being fluidically connected, via connection means 21, to a trace gas source 15 external to the apparatus 10, and
  an electrovalve Ev2 controlled to be able to allow the flow and injection of trace gas (during the leak location phase) inside the pitot circuit Pt and/or static circuit Ps (an electrovalve Ev1 allows the flow of pressurised air during the leak detection phase).

In the embodiment described, the trace gas used is a noble gas, such as helium for example.

Such a configuration of the installation enables the operator to carry out leak detection and location tests in the pitot circuit Pt and static circuit Ps solely with the test apparatus 10. Only a helium source and a detection probe are required.

In other words, when a leak is detected, it is not necessary to disconnect the test apparatus 10 from the pitot circuit Pt and static circuit Ps. The same test apparatus 10 is indeed capable of injecting a tracer gas into these two circuits to help locate the leak(s) with the trace gas detection probe 30.

The operator's task is thus simplified.

In the embodiment illustrated, the detection probe 30 is a mobile and portable gas sniffer device intended to be moved, by a user, along the external surface of the pitot circuit Pt and/or static circuit Ps.

To ensure that the detection probe 30 detects the presence of a leak, it is preferable to move same at a speed of less than 1 cm/s.

The trace gas detection probe 30, which is well-known to those skilled in the art, is connected via a wired or wireless link, to the test apparatus 10 so as transmit thereto the data relating to the leak identified, such as the leak value and rate.

The detection probe 30 comprises suction means, or connection means suitable for being coupled with external suction means, configured to draw in the gases of the surrounding environment.

Moreover, recognition means, disposed inside the detection probe, make it possible to differentiate the trace gas from the gases of the surrounding environment.

The detection probe 30 comprises at least one audio and/or visual indicator of the presence of a leak at a specific location of the external surface of one of the anemometer circuits.

The leak test apparatus 10 further comprises an interface 16 enabling the user to control the leak detection and location steps in the pitot circuit Pt and static circuit Ps.

The interface 16 makes it possible to manually configure, via input means 161, each of the leak detection and location phases by acting notably upon the set-points in respect of pressure, speed, altitude, level and execution time of the detection test.

Such input means 161 further enable the user to navigate and select a menu or an operating mode (manual or automatic).

Moreover, the interface 16 comprises display means 162 configured to display the data relating to the leak detection and location tests, namely the configuration data entered and the data obtained from the tests, such as the leak values for example.

In the embodiment illustrated, the interface 16 is portable and connected to the leak test apparatus 10 via a wireless link.

Such an interface 16 enables an operator to monitor the progress of the method for detecting and locating leaks while minimizing the operator's movements.

The tests for checking the leak-tightness of the fluid transport circuits may be carried out by a single operator which makes it possible to reduce the costs and complexity of such tests.

Moreover, the leak test apparatus 10 comprises communication means 17 configured to transmit all or part of the data relating to the leak detection and location phases to remote backup means.

In the embodiment illustrated, the communication means 17 are integrated in the test apparatus 10 and are configured to transfer the test data to remote storage means, such as a networked backup server 40 and/or a dematerialized backup space 40'.

Such a configuration notably makes it possible to enhance the traceability of the leaks detected and located using a database fed and updated automatically during the successive uses of the installation according to the invention.

A database makes it possible to associate particular parameters with each aircraft.

Furthermore, the technician can establish the leak, the detector indicating a leak rate (the presence of a leak, the location thereof and value thereof are saved and associated with the aircraft).

For fluid transport circuit designers, such a database may help determine, by redundancy, one or more sensitive zones of the fluid circulation circuits tested so as to enhance same.

For the users of the installation according to the invention, such a database may help simplify the task by automatically defining the test parameters according to the nature of the fluid transport circuit to be tested.

The leak test apparatus 10 further comprises control means 18, such as a microcontroller, configured to control the pumps Pp and Pv, the electrovalves, the user interface 16, the detection probe 30 and the communication means 17 so as to implement the different steps of the method for detecting and locating leaks, detailed hereinafter with reference to FIG. 3.

Figure 2:
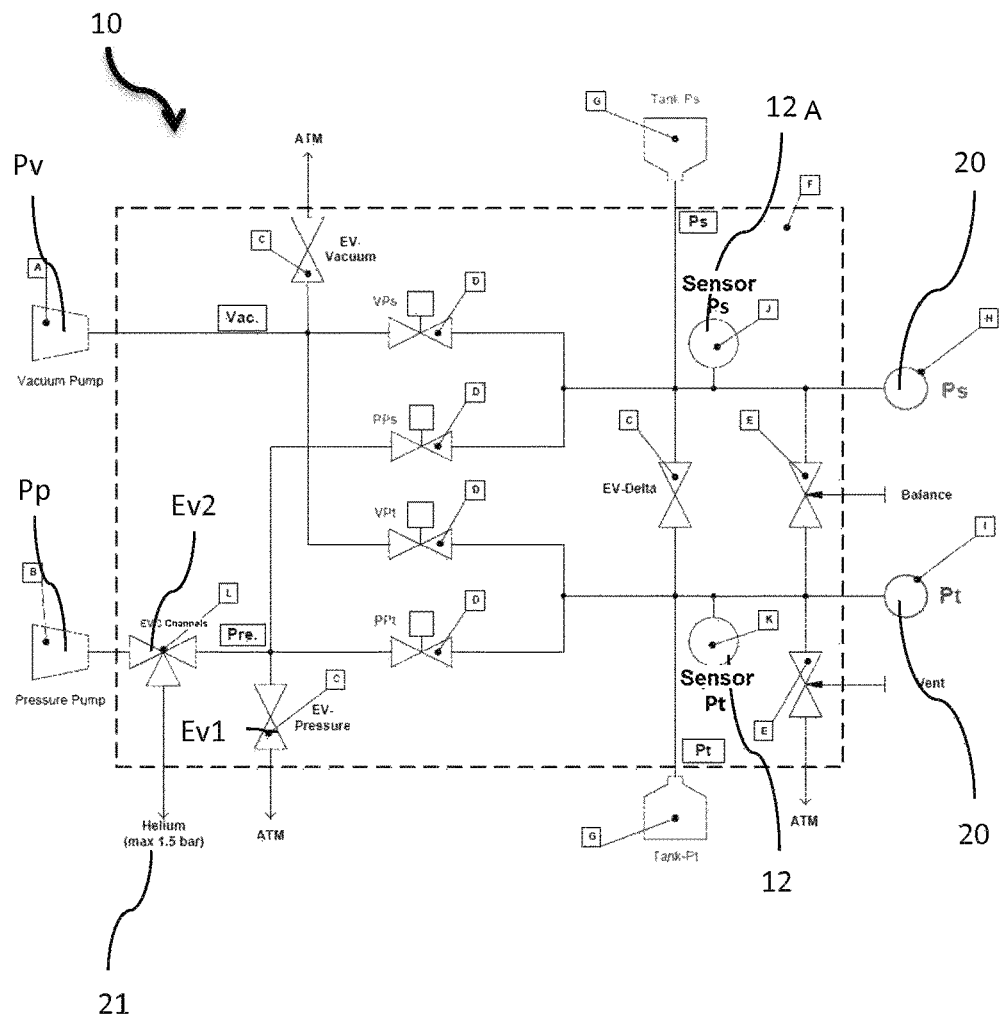
FIG. 2 represents the schematic diagram of a test apparatus used in the installation for detecting and locating a leak in FIG. 1.

FIG. 2 represents an example of a schematic diagram of the test apparatus 10 in FIG. 1.

The test apparatus 10 comprises an external air supply connected to a first electrovalve Ev1 which allows or blocks, according to the position thereof, the introduction of air into the test apparatus, and the pitot circuit Pt and/or static circuit Ps.

The test apparatus 10 comprises a trace gas supply connected to a second electrovalve Ev2 which allows or blocks, according to the position thereof, the introduction of trace gas into the test apparatus, and the pitot circuit Pt and/or static circuit Ps.

The second electrovalve Ev2 comprises a first channel coupled with the output of the pressure pump Pp, a second channel coupled with a trace gas supply and a third channel coupled with the output of the first electrovalve Ev1.

According to the position of the electrovalves Ev1, Ev2, the pressure pump Pp injects pressurised air or the trace gas into the pitot circuit Pt and static circuit Ps.

Thus, when a leak is detected by the leak test apparatus 10, the electrovalve Ev1, and therefore the air feed circuit, is closed, and the electrovalve Ev2, and therefore the trace gas feed circuit, is opened, so as to enable the location of the leak(s).

The test apparatus 10 comprises a shut-off valve of one of the pitot and static circuits.

Figure 3:
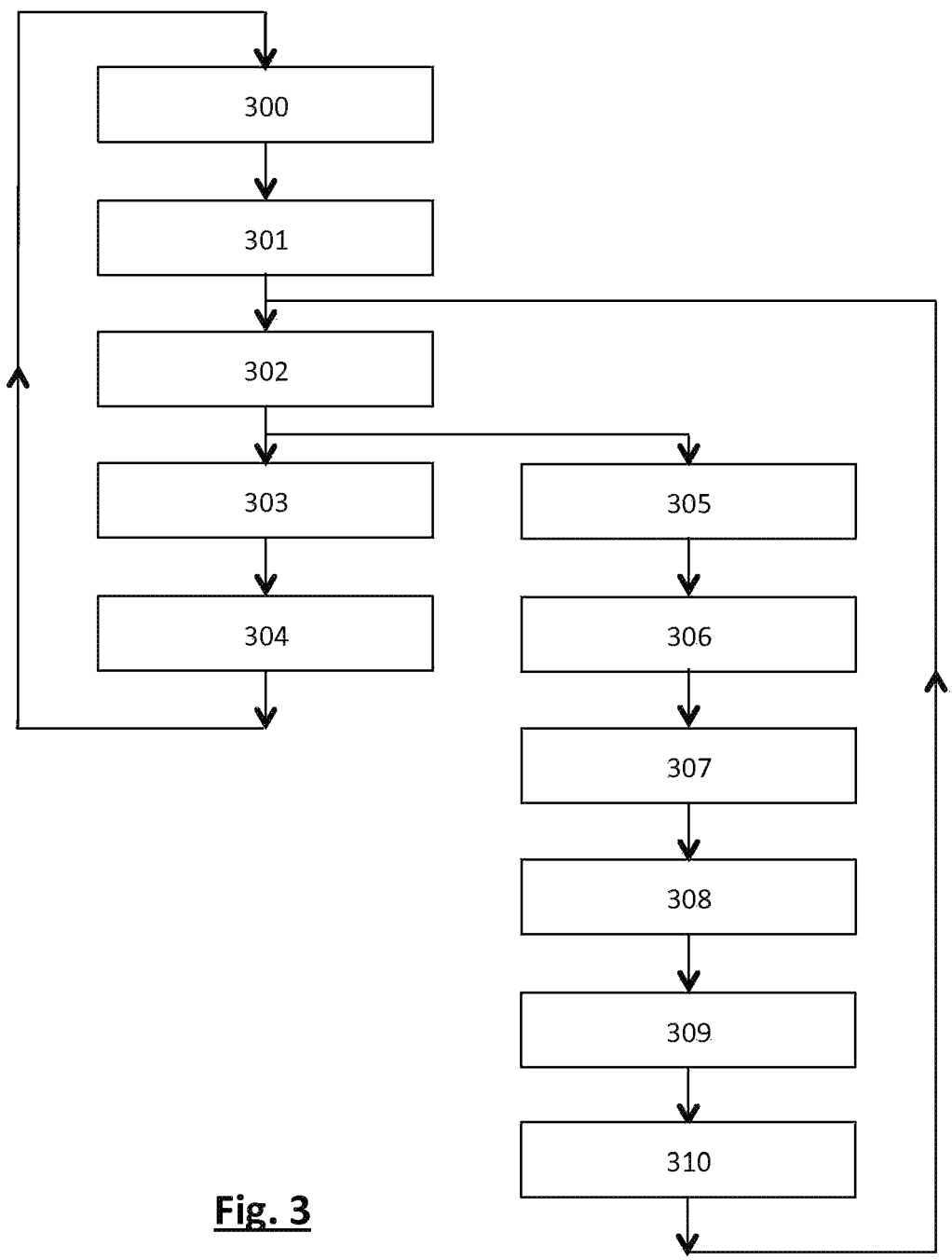
FIG. 3 illustrates a schematic diagram of the successive steps of a method for detecting and locating a leak in the anemometer circuits of an aircraft used in an installation according to the invention.

FIG. 3 details the main steps of a method for detecting and locating a leak according to the invention, in the anemometer circuits of an aircraft, used in an installation 1 described above.

In the initial step 300, the operator connects the installation 1 for detecting and locating leaks to the anemometer circuits of the aircraft to be tested when the latter is on the ground.

As a preliminary step, the operator connects a trace gas generator, such as a helium cylinder to the internal trace gas conduit 14 via connection means 21 of the test apparatus 10.

Moreover, if the test parameters are not predefined, the operator enters these via the interface 16.

The test parameters relate notably to the set-points in respect of pressure, test duration, altitude, etc.

When the configuration is complete, the operator validates the data entered to be able to continue the leak detection and location test.

In step 301, the test apparatus 10 injects, via the pressure pump Pp, pressurised air into the pitot circuit Pt and static circuit Ps so as to simulate an increase in altitude at a predetermined speed, until a predetermined altitude level is reached.

In step 302, when the internal pressure of the circuits corresponds to the set-point value entered, the injection of pressurised air is halted and a first pressure measurement is made, via the pressure sensors 12, 12A, then a second measurement is made after a predetermined time interval.

If both pressure measurements are identical or have only varied by a slight predetermined value margin, then the pitot circuit Pt and static circuit Ps are considered to be leak-tight.

The circuits being leak-tight, the pressurised air present therein is evacuated by the vacuum pump Pv, in step 303, and the data relating to the tests are transmitted to the backup means 40, 40' (step 304).

The method for detecting and locating leaks is then complete and the installation 1 for detecting and locating leaks may be disconnected or used for another leak detection operation (300) on another aircraft.

In the case where, in step 302, the second pressure measurement is less than the first measurement, then it is established that at least one leak is present on at least one of the pitot circuit Pt and static circuit Ps.

In this case, the operator is informed, via the interface 16, of the presence of a leak and is prompted to run, again via the interface 16, a location test thereof.

Before carrying out the leak location test, the operator must, in step 305, choose the pitot Pt and/or static Ps circuit(s) on which the leak location test is to be carried out.

In other words, the operator may choose to seal one circuit to carry out the leak location test on a single circuit.

This makes it possible to reduce the test duration, if one of the circuits is more prone to leaks than the other for example, and subsequently minimize the trace gas consumption.

In step 306, the pressurised air present in the selected circuit(s) is evacuated by the vacuum pump Pv up to a predetermined set-point value.

In step 307, the trace gas is injected into the pitot circuit Pt and/or static circuit Ps, until the circuit(s) are filled with helium at a given pressure.

In step 308, the operator equipped with the detection probe 30 moves same close to the pitot circuit Pt and/or static circuit Ps, notably in the vicinity of sensitive zones prone to leaks, so as to locate said leak.

When the detection probe 30 passes over a leak, the trace gas discharged from the conduit under test is drawn in by the probe which warns the operator of the presence of a leak and transmits the data relating to same, notably the leak value, to the test apparatus 10.

The operator being informed of the location of the leak, they temporarily halt, in step 309, the leak location test.

Thenceforth, the operator can, with the suitable equipment, repair the leak.

When the latter is repaired, the operator repeats the leak location test following step 302, so as to check that the leak previously detected is sealed and repeat the leakdetection test to check the presence or not of another leak.

If the circuit is found to be leak-tight, the helium is evacuated from the circuit (step 310).

In the embodiment described, the installation according to the invention is used for detecting and locating leaks in the pitot and static circuits of an aircraft.

However, such an installation finds applications in any field of activity having liquid or gaseous fluid transport circuits, such as the chemical industry, nuclear power plants, natural gas pipelines, oil pipelines.

In a particular embodiment, backup means of the data relating to the leak detection tests are situated in the leak test apparatus.

Moreover, the interface 16 may be rigidly connected to the test apparatus.

In an embodiment, the leak detection and location test parameters are predefined in the leak test apparatus.

In one example, the filling and draining pressure parameters may be entered as standard in the apparatus. In an alternate example, a so-called "expert" mode may be envisaged to enable the operator to adjust these pressures.

In one example wherein the operator does not have access to the data configuration, the interface 16 merely displays the progress of the leak detection and location tests.

What is claimed is:

1. An installation for detecting and locating a leak in a fluid transport circuit of an anemometer circuit of an aircraft, the installation comprising:
   a leak test apparatus comprising:
      a pressure pump in selected fluid communication with an atmospheric air source and said fluid transport circuit, the leak test apparatus operable to connect to the fluid transport circuit and supply pressurized air to the fluid transport circuit to detect a leak in the fluid transport circuit;
   a trace gas source connected to and in fluid communication with the leak test apparatus, the trace gas source in selected fluid communication with the fluid transport circuit through the leak test apparatus, on the detection of the leak, the leak test apparatus is operable to supply pressurized trace gas to the fluid transport circuit; and
   a trace gas detection probe operable to selectively be moved along said fluid transport circuit on an outside thereof, in order to locate the leak.

2. The installation according to claim 1, wherein the detection probe is connected to said leak test apparatus by at least one of a wired or wireless link.

3. The installation according to claim 1, wherein said installation further comprises at least one indicator operable to alert an operator of a presence of a fluid leak, the at least one indicator positioned on at least one of the leak test apparatus or the detection probe.

4. The installation according to claim 1, wherein said leak test apparatus further comprises draining means operable to selectively drain said trace gas positioned inside said fluid transport circuit.

5. The installation according to claim 1, wherein said tracer gas comprises helium.

6. The installation according to claim 1, further comprises a control interface comprising:
   input means; and
   display means operable to visually display data relating to a leak test.

7. The installation according to claim 1, wherein said leak test apparatus further comprises communication means operable to transmit leak location data with a remote data backup unit.

8. A method for detecting and locating a leak in a fluid transport circuit of an anemometer circuit of an aircraft, using an installation including a leak test apparatus, the method comprising steps of:
- connecting the leak test apparatus to the fluid transport circuit;
- pressurizing with atmospheric air through the leak test apparatus an inside of the fluid transport circuit;
- taking a first pressure measurement inside the fluid transport circuit;
- taking a second pressure measurement of the fluid transport circuit after a predetermined time interval;
- comparing the first and second pressure measurements, wherein where a pressure drop corresponding to a presence of a leak is detected;
- injecting under pressure through the leak test apparatus a trace gas into said fluid transport circuit to pressurize the fluid transport circuit with trace gas; and
- locating said leak by moving a trace gas detection probe along said fluid transport circuit on an outside thereof.

9. The method according to claim 8, wherein prior to said injecting the trace gas, the method further comprises a step of evacuating said fluid transport circuit.

10. The method according to claim 9, wherein once the leak has been located, the method further comprises a step of extracting said trace gas from said fluid transport circuit.

11. The method of claim 8 further comprising the step of maintaining continuous connection of the leak test apparatus to the fluid transport circuit during pressurizing the fluid transport circuit with atmospheric air to detect the leak and injecting the trace gas through the leak test apparatus into the fluid transport circuit to locate the leak.

12. The method of claim 11, wherein after detecting the leak, the method further comprising the step of connecting a trace gas source to the leak test apparatus in selective fluid communication with the fluid transport circuit.

13. A leak test installation for detecting and locating fluid leaks in a fluid transport circuit, the leak test apparatus comprising:
- a leak test apparatus operable to connect to a fluid transport circuit, the leak test apparatus comprising:
  - a housing having an outer surface;
  - a controller positioned in the housing;
  - an air pressure pump positioned in the housing in electronic communication with the controller and in fluid communication with a fluid transport circuit, the air pressure pump operable to selectively pressurize the fluid transport circuit with atmospheric air through the housing;
  - an air pressure sensor positioned in the housing in electronic communication with the controller and in fluid communication with the fluid transport circuit, the air pressure sensor operable to take a first air pressure measurement and a second air pressure measurement, the second air pressure measurement taken at a predetermined later time than the first air pressure measurement, the controller operable to compare the first air pressure measurement and the second air pressure measurement and identify a fluid leak in the fluid transport circuit;
  - a vacuum pump positioned in the housing in electronic communication with the controller and in fluid communication with the fluid transport circuit, the vacuum pump operable to selectively evacuate the pressurized air from the fluid transport circuit;
  - a trace gas source connected to the housing in fluid communication with the air pressure pump and selected fluid communication with the fluid transport circuit, wherein on detection of the fluid leak and while maintaining connection of the leak test apparatus to the fluid transport circuit, the trace gas source is operable to selectively supply trace gas through the housing into the fluid transport circuit to pressurize the fluid transport circuit with the trace gas; and
  - a trace gas probe in electronic communication with the controller, the trace gas probe operable to detect the location of the identified fluid leak along an exterior of the fluid transport circuit.

14. The installation of claim 13 further comprising an operator interface in communication with the controller, the interface operable to at least one of receive or display set points of pressure, speed, altitude, level and execution time of the leak test apparatus to identify the leak.

15. The installation of claim 13, wherein the fluid transport circuit comprises an aircraft anemometer circuit.

16. The installation of claim 15, further comprising:
- a data backup device in data communication with the controller positioned remotely from the leak test apparatus, the data backup device operable to store the first air pressure measurement and the second air pressure measurement.

17. The installation of claim 15, wherein the trace gas comprises helium.

18. The installation of claim 15, wherein the anemometer circuit comprises a pitot circuit and a static circuit, the test leak apparatus operable to connect to both the pitot circuit and the static circuit, the pitot circuit separately pressurizable with air and tracer gas relative to the static circuit.

19. The installation according to claim 18, wherein the leak test apparatus further comprises a third valve positioned in the housing downstream of the air pressure pump and upstream of the fluid transport circuit, the third valve in electronic communication with the controller and fluid communication with the fluid transport circuit, the third valve operable to alternately supply the pressurized atmospheric air or the trace gas to the fluid transport circuit.

20. The installation of claim 19, further comprising:
- a first valve positioned in the housing downstream of air pressure pump and upstream of the third valve, the first valve in electronic communication with the controller and in fluid communication with an atmospheric air source, the pressure pump and the third valve, the first valve operable to selectively supply the pressurized atmospheric air to the third valve; and
- a second valve positioned in the housing downstream of air pressure pump and upstream of the third valve, the second valve in electronic communication with the controller and in fluid communication with the trace gas source, the pressure pump and the third valve, the second valve operable to selectively supply the pressurized trace gas to the third valve.

* * * * *